United States Patent

Quinn

[15] 3,655,531

[45] Apr. 11, 1972

[54] METALIZING SUBSTRATES

[72] Inventor: Edward J. Quinn, Tonawanda, N.Y.

[73] Assignee: Hooker Chemical Corporation, Niagara Falls, N.Y.

[22] Filed: June 6, 1969

[21] Appl. No.: 831,224

Related U.S. Application Data

[63] Continuation-in-part of Ser. No. 747,495, July 25, 1968, abandoned.

[52] U.S. Cl. .................................204/30, 204/20, 204/38 B, 117/47 A

[51] Int. Cl. ....................................................C23b 5/60

[58] Field of Search..............................204/20, 30; 117/47 R

[56] References Cited

UNITED STATES PATENTS 3,235,473 2/1966 Le Duc....................................204/30

3,282,737 11/1966 Hintermann et al...................136/120

OTHER PUBLICATIONS

Lowenheim, F. A., Modern Electroplating 1963, N.Y. John Wiley & Sons Inc. p. 699.

*Primary Examiner*—John H. Mack
*Assistant Examiner*—R. L. Fay
*Attorney*—Peter F. Casella, Donald C. Studley, Richard P. Mueller, James F. Mudd and Edward A. Meilman

[57] ABSTRACT

Substrates, particularly thermoplastic resins and polymers, are plated with metals by pre-treatment of the substrate with phosphorus in an organic solvent to deposit phosphorus at the surface, followed by contacting the treated surface wit a metal salt or complex thereof, to form a metal-phosphorus compound. Thereafter the substrate is subjected to an aqueous hypophosphite solution. The resulting treated surface is conductive and can be readily electroplated by conventional techniques.

13 Claims, No Drawings

METALIZING SUBSTRATES

This is a continuation-in-part of application Ser. No. 747,495, now abandoned filed July 25, 1968.

BACKGROUND OF THE INVENTION

There is a rapidly increasing demand for metal plated articles, for example, in the production of low cost plastic articles that have a simulated metal appearance. Such articles are in demand in such industries as automotive, home appliance, radio and television and for use in decorative containers and the like.

It is an object of the invention to provide an improved process for the metal plating of plastics. Another object of the invention is to provide an improved process that is applicable to plating of many different substrates, particularly the thermoplastic polymers. A further object of the invention is to provide substrates having an improved conductivity so that they may be electroplated readily by conventional techniques. The process of this invention can be used for unidirectional mirrors and the like; water and liquid collecting devices and the like; protective coatings on houses, cars, boats, power line poles, street lights and the like; in thermal control of clothing, houses and the like; and the like.

SUMMARY OF THE INVENTION

This invention provides an improved process which comprises forming a metal-phosphorus compound at the surface of a substrate and subjecting the thus-treated substrate to an aqueous hypophosphite solution to render the surface highly susceptible to conventional electrolytic plating. More particularly, this invention relates to a process which comprises contacting a substrate with phosphorus so as to deposit phosphorus at the surface, contacting the thus-treated surface with a solution of a metal salt or complex thereof to form a metal-phosphorus compound, and thereafter subjecting the thus-treated substrate to an aqueous hypophosphite solution.

DESCRIPTION OF THE PREFERRED EMBODIMENT

An article having a metal phosphide adherently formed at the surface of the substrate is provided in accordance with the process of copending application Ser. No. 683,793, filed Nov. 17, 1967. That process is applicable to substrates, such as plastics and to other substantially non-metallic substrates. Suitable substrates include, but are not limited to, cellulosic and ceramic materials such as cloth, paper, wood, cork, cardboard, clay, porcelain, leather, porous glass, asbestos cement, and the like.

Typical plastics to which the process of this invention is applicable include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene with other olefins, polybutadiene; polymers of butadiene, polyisoprene, polystyrene and polymers of pentene, hexene, cyclopentadiene, methylstyrene, and the like. Other polymers useful in the invention include chlorinated polypropylene and methylene; polyindene, indenecoumarone resins; polymers of acrylate esters and polymers of methacrylate esters, acrylate and methacrylate resins such as ethyl acrylate; alkyd resins; cellulose derivatives such as cellulose acetate; cellulose acetate butyrate, cellulose nitrate, ethyl cellulose; epoxy resins; furan resins (furfuryl alcohol or furfural ketone); hydrocarbon resins from petroleum, isobutylene resins (polyisobutylene); isocyanate resins (polyurethanes); melamine resins such as melamine-formaldehyde; oleo-resins; phenolic resins such as phenol-formaldehyde; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde; rubbers such as natural rubber, synthetic polyisoprene reclaimed rubber, chlorinated rubber, polybutadiene; polysulfides (Thiokol); terpene resins; urea resins; vinyl resins such as polymers of vinyl acetal; polyvinylchloride; polyformaldehyde; polyphenylene oxide; polymers of diallyphthalates and phthalates; polycarbonates of phosgene or thiophosgene and dihydroxy compounds such as bisphenols, thermoplastic polymers of bisphenols and epichlorohydrin (tradenamed Phenoxy polymers); graft copolymers and polymers of unsaturated hydrocarbons and an unsaturated monomer, such as graft copolymers of polybutadiene, styrene and acrylonitrile, commonly called ABS resin; ABS-polyvinylchloride polymers, recently introduced under the tradename of Cycovin; and acrylic polyvinyl chloride polymers, known by the tradename of Kydex 100.

The polymers can be used in the unfilled condition, or with fillers such as glass fiber, glass powder, glass beads, asbestos, talc and other mineral fillers, wood flour and other vegetable fillers, carbon in its various forms, dyes, pigments, waxes and the like.

The substrates can be in various physical forms, such as shaped articles, for example, moldings, sheets, rods, and the like; fibers, films, and fabrics, and the like and of various thickness.

In the first step of the preferred process of Ser. No. 683,793, the substrate is subjected to elemental white phosphorus, which includes the various impure or commercial grades sometimes referred to as yellow phosphorus. The phosphorus can be utilized in the vapor phase, as a liquid or dissolved in a solvent. Suitable solvents or diluents for the elemental phosphorus are solvents that dissolve elemental phosphorus and which preferably swell the surface of a plastic without detrimentally affecting the surface of the plastic.

When a solution of phosphorus is employed in the process, the solution concentration is generally in the range from about 0.0,001 weight percent of phosphorus based on the weight of the solution up to a saturated solution and preferably from about 0.1 to about 2.5 percent. Prior to subjecting the substrate to the elemental phosphorus, in gaseous, liquid or solution, the surface of the article should be clean. When a solution is used, the solvent generally serves to clean the surface. A solvent wash may be desirable when gaseous or liquid phosphorus is employed. However, it is not necessary to subject the substrate to special treatment such as etching, polishing and the like. The phosphorus treatment is generally conducted at a temperature below the softening point of the substrate, and below the boiling point of the solvent, if a solvent is used. Generally, the temperature is in the range of about 10 to about 135 degrees centigrade, but preferably in the range of about 10 to about 100 degrees centigrade. The contact time varies depending on the nature of the substrate, the solvent and temperature, but is generally in the range of about 1 second to 1 hour or more, preferably in the range of about 1 to 10 minutes.

As a result of the first treatment step, the phosphorus is deposited or nucleated at the surface of the substrate. By this is meant that the phosphorus can be located on the surface, embedded in the surface and embedded beneath the surface of the substrate. The location of the phosphorus is somewhat dependent on the action of the solvent and reaction conditions on the surface.

Following the first treatment step, the substrate can be subjected to water and/or aqueous solution of a surfactant, as disclosed in copending application Ser. No. 671,337, filed Sept. 28, 1967 now abandoned, and then can be dried by merely exposing the substrate to the atmosphere or to inert atmospheres such as nitrogen, carbon dioxide, and the like, or by drying the surface with radiant heaters or in a conventional oven. Drying times can vary considerably, for example, from 1 second to 30 minutes or more, preferably 5 seconds to 10 minutes, more preferably 5 seconds to 20 seconds. The rinsing and drying steps are optional.

In the second treatment step of the process, the phosphorus-treated substrate is subjected to a bath containing a solution of a metal salt or a complex of a metal salt, which is capable of reacting with the phosphorus to form a metal phosphide. The term metal phosphide, as used herein, means the metal-phosphorus coating which is formed at the surface of the substrate. Without being limited to theory, the metal phosphide may be an ionic compound or a solution (alloy). The metals generally employed are those of Groups IB, IIB, IVB, VB, VIB, VIIB and VIII of the Periodic Table appearing on pages 60–61 of Lange's Handbook of Chemistry (Revised Tenth Edition). The preferred metals are copper, silver, gold, chromium, cobalt, nickel, palladium, and the like. Some useful metal salts include copper sulfate, copper chloride, silver nitrate, nickel cyanide and nickel chloride.

The metal salts can be complexed with a complexing agent that produces a solution having a basic pH (>7). Particularly useful are the ammoniacal complexes of the metal salts, in which one to six ammonia molecules are complexed with the foregoing metal salts. Typical examples include $NiSO_4 \cdot 6NH_3$, $NiCl_2 \cdot 6NH_3$, and the like. Other useful complexing agents include quinoline, amines and pyridine. Useful complexes include compounds of the formula $MX_2Q_2$, wherein M is the metal ion, X is chlorine or bromine and Q is quinoline. Typical examples include: $CoCl_2Q_2$, $CoBr_2Q_2$, $NiCl_2Q_2$. Also useful are the corresponding monoquinoline complexes such as $CoCl_2Q$. Useful amine complexes include the mono-(ethylenediamine)-, bis-(ethylenediamine)-, tris-(ethylenediamine)-, complexes of salts such as copper sulfate. Typical pyridine complexes include $NiCl_2(py)_2$ and $CuCl_2(py)_2$ where py is pyridine.

The foregoing metal salts and their complexes are used in ionic media, preferably in aqueous solutions. However, non-aqueous media can be employed such as alcohols, for example, methyl alcohol, ethyl alcohol and the like; cyclic ether, for example, tetrahydrofuran, dioxane, and the like. Mixtures of alcohol and water can be used. Also useful are ionic mixtures of alcohol with other miscible solvents. The solution concentration is generally in the range from about 0.1 weight percent metal salt or complex based on the total weight of the solution up to a saturated solution, preferably from about 1 to about 10 weight percent metal salt or complex. The pH of the metal salt or complex solution can range from about 4 to 14 but is generally maintained in the basic range, i.e., greater than 7.0, and preferably from about 10 to about 13.

The metal salt solution can also contain a stable anion selected from the group consisting of $OH^-$, $BR_3H^-$ and $AlR_3H^-$, wherein each R is individually selected from the group consisting of alkyl, aryl and hydrogen, for low temperature applications as described in copending application Ser. No. 694,122, filed Dec. 28, 1967. Only a small amount of stable anion is added to the metal salt bath because the addition of too much stable anion will cause the metal to precipitate.

The step of subjecting the phosphorus-treated substrate to the solution of metal salt is generally conducted at a temperature below the softening point of the substrate, and below the boiling point of the solvent, if one is used. The addition of a small amount of stable anion allows the treating step to be accomplished efficiently near room temperature, i.e., about 20 degrees centigrade. Generally the temperature is in the range of about 10 to 110 degrees centigrade, preferably from about 20 to 100 degrees centigrade. The time of contact can vary considerably, depending on the nature of the substrate, the characteristics of the metal salts employed and the contact temperature. However, the time of contact is generally in the range of about 0.1 to 30 minutes, preferably about 5 to 10 minutes.

The process of the present invention can be carried out in one continuous operation, or the substrate can be stored after removal from the metal salt bath and subjected to further treatment at some later time. Subjecting the substrate to a bath containing a nickel salt and $OH^-$ as the stable anion results in a black appearance. If any of the other stable anions, or if a mixture of stable anions is employed, the substrate acquires a metallic appearance. Both metal phosphide coatings are generally conductive and both allow the substrate to be stored. When a black appearance has been obtained and it is desired to have a metallic appearance, the substrate can be subjected to the bath a second time, said bath now containing any of the stable anions besides $OH^-$ or a mixture of any of stable anion.

The treated substrates that result from contacting the phosphorus-treated surface with a metal salt solution are subjected to an aqueous hypophosphite solution. This results in the improved conductivity of the metal phosphide without depositing metal on the metal phosphide, i.e., the thickness of the metal phosphide remains constant. Suitable hypophosphites include the alkali metal hypophosphites such as the hypophosphites of sodium, potassium, rubidium and cesium, and the alkaline earth metal hypophosphites such as the hypophosphites of magnesium, calcium, strontium and barium. The solution is generally in the range of about 0.1 weight percent hypophosphite based on the total weight of the solution up to a saturated solution, preferably from about 2 to about 10 weight percent hypophosphite. The subjecting of the substrate to the aqueous hypophosphite solution is generally conducted at a temperature below the softening point of the substrate and below the boiling point of the hypophosphite solution. Generally, the temperature is in the range of about 10 to 100 degrees centigrade and preferably from about 60 to 90 degrees centigrade. The time of contact varies considerably, depending on the nature of the substrate, the particular metal phosphide coating and the contact temperature. However, the time of contact is generally in the range of 0.1 to 30 minutes, preferably about 5 to 10 minutes. After the hypophosphite treatment the substrate can be stored and subjected to electrolytic treatment at some later time or can be subjected to electrolytic treatment immediately.

The treated substrates that result from contacting the treated surface with the aqueous hypophosphite solution can, if desired, be subjected to a process that has become known in the art as electroless plating or chemical plating. However, because the process of this invention results in the increased electrical conductivity of the metal phosphide, electroless plating is not generally necessary or desirable, i.e., the necessity of maintaining the sensitive electroless plating baths is generally avoided. It was found that when a dilute solution of phosphorus was employed in the foregoing process, i.e., less than about 1.5 weight percent phosphorus, the resulting metal phosphide had a tendency to be attacked in an acid electroless bath. By employing the aqueous hypophosphite solution, the metal phosphide can be plated in an acid electroless bath without being dissolved in the bath.

The treated substrates of the invention can be electroplated by processes known in the art. The article is generally used as the cathode. The metal desired to be plated is generally dissolved in an aqueous plating bath, although other media can be employed. Generally, a soluble metal anode of the metal to be plated can be employed. In some instances, however, a carbon anode or other inert anode is used. Suitable metals, solutions and conditions for electroplating are described in Metal Finishing Guidebook Directory for 1967, published by Metals and Plastics Publications, Inc., Westwood, N.J.

The following examples serve to illustrate the invention but are not intended to limit it. Unless otherwise specified, all temperatures are in degrees centigrade and all parts are understood to be expressed in parts by weight.

EXAMPLE 1

A polypropylene sheet was immersed in a 2 percent solution of phosphorus in trichloroethylene at 60° C. for 3 minutes and them washed with a 60 percent solution of DMF in water at 50° C. for 30 seconds. The sheet was then placed in a two liter nickel bath which contained 1950 cc of 2 percent $NiCl_2$ in 23 percent $NH_4OH$ and 50 cc of 20 percent NaOH. After 10 minutes the sheet was withdrawn and was found to have obtained a conductive black nickel phosphide coating. The immersion in the nickel bath was done at room temperature.

EXAMPLE 2

An ABS plastic sample was treated as in Example 1 except that a 1 percent solution of phosphorus in a mixture of trichloroethylene and perchloroethylene was employed and the time of immersion in the phosphorus solution was 2 minutes. An excellent quality black coating was produced on the sample.

EXAMPLE 3

Specimens of polyethylene, polystyrene, polyvinylchloride and polymethylmethacrylate were treated with phosphorus vapor by suspending the plastic specimen for 1 hour in an atmosphere of phosphorus vapor maintained at 100° C. Subsequently, the phosphorus-treated plastic specimens were immersed for 10 minutes in a solution prepared by adding sufficient ammonium hydroxide to a silver nitrate solution to form the complex $AgNO_3 \cdot 6NH_3$. The treatment resulted in the formation of a silver phosphide deposit at the plastic surface.

EXAMPLE 4

A specimen of polyethylene was immersed in a solution of yellow phosphorus dissolved in trichloroethylene for 1 minute. The resulting phosphorus-treated polyethylene specimen was thereafter immersed in an aqueous solution of copper sulfate for several minutes. The treated polyethylene specimen was washed with water, wiped dry and then dried with hot air. The resulting film of copper phosphide was found to be conductive.

EXAMPLE 5

Samples of cardboard, cork, porous clay, and asbestos cement were subjected to a 2 percent solution of phosphorus in trichloroethylene at 60° C. and then to a 10 percent solution of nickel sulfate in excess ammonium hydroxide at 90° C. to form a nickel phosphide at the surface of the substrates.

EXAMPLES 6–10

Samples of polypropylene were cleaned by spraying with acetone, hand rubbing with paper tissues and immersing in trichloroethylene. The samples were immersed for a period of one minute in a bath containing a 2 percent solution of yellow phosphorus in trichloroethylene which was held at 65±5 degrees centigrade. Thereafter the samples were washed with water for 15 seconds and then immersed for 10 minutes in a bath which contained 30.5 parts $NiSo_4 \cdot 6H_2O$, 900 parts distilled water, and 900 parts aqueous ammonia solution containing 28–30 percent ammonia by weight. The bath was maintained at 65±3 degrees centigrade. Several of the polypropylene samples were designated as controls and rinsed successively with distilled water at room temperature, ethanol at room temperature, and trichloroethylene at 50±5 degrees centigrade. The other polypropylene samples were immersed in a solution of 5 percent sodium hypophosphite monohydrate in water for 10 minutes. The temperature of the aqueous hypophosphite solution is shown in Table I. Thereafter the samples were successively rinsed in distilled water at room temperature, ethanol at room temperature, and trichloroethylene at 50±5 degrees centigrade. After removal from the trichloroethylene rinse, all samples were dried for 5 minutes at 100° C. and then tested for electrical resistance. The resistance in ohms is shown in Table I.

TABLE I

| Example | Type of Sample | Temperature of Aqueous Hypophosphite Bath | Resistance, Ohms/inch Front | Back |
|---|---|---|---|---|
| 6 | Experimental | 60 | 250 | 220 |
| 7 | Control | — | 2000 | 1500 |
| 8 | Experimental | 90 | 260 | 400 |
| 9 | Experimental | 90 | 200 | 200 |
| 10 | Control | — | 1500 | 1200 |

Table I demonstrates that the process of this invention substantially reduces the resistance of the metal phosphide, which will facilitate subsequent electroless and/or electrolytic treatment of the substrates.

EXAMPLE 11

Following the procedure of Examples 6–10, the substrates of Examples 3 and 4 having silver and copper phosphides formed at their surface can be subjected to a water solution of 5 percent sodium hypophosphite to substantially decrease the electrical resistance of silver and copper phosphides.

EXAMPLE 12

The hypophosphite-treated samples of Examples 6–11 can be electroplated by employing the samples as the cathode in a nickel chloride plating bath and passing a current of 1 ampere through the plating bath for 30 minutes.

EXAMPLES 13–14

Four polypropylene samples were immersed in a 60 degrees centigrade trichloroethylene bath for 2 minutes and then transferred to 0.2 percent solution of yellow phosphorus in trichloroethylene being maintained at 55 degrees centigrade and which had a layer of sodium carbonate-water on the surface of the trichloroethylene. After 2 minutes in the phosphorus solution, the samples were withdrawn into the air for 30 seconds and then placed back into the sodium carbonate-water for 4 seconds. The samples were immersed for 10 minutes in a 70 degrees centigrade bath containing 190 milliliters of 2 M $NiSO_4 \cdot 6H_2O$, 1.276 milliliters of 4 M ethylene diamine, 420 milliliters of 10 M NaOH and sufficient water to yield a volume of 7 liters. Thereafter, the four samples were washed with water and oven dried at 85 degrees centigrade for 30 minutes.

An acid electroless nickel bath was prepared with 90 grams of $NiCl_2 \cdot 6H_2O$, 30 grams of sodium citrate, 30 grams of sodium hypophosphite, sufficient water to yield a volume of 3 liters, and sufficient $H_2SO_4$ to obtain a pH of 4.5. One treated plastic sample was immersed in the acid electroless bath at 75 degrees centigrade for 5 minutes and when it was withdrawn, it was observed that the nickel phosphide had been attacked (dissolved) by the bath. The other three plastic samples were subjected to a 5 percent aqueous $NaH_2PO_2$ solution for 5 minutes at 66 degrees centigrade and then to the acid electroless nickel bath for 5 minutes at 75 degrees centigrade. It was observed that the nickel phosphide of each sample which had been hypophosphite treated were not attacked in the electroless bath. The three samples were thereafter electroplated with nickel and copper to provide adherent metal coatings on the treated surfaces.

Various changes and modifications can be made in the products and process of this invention without departing from the spirit and scope of the invention. The various embodiments of the invention disclosed herein serve to further illustrate the invention but are not intended to limit it.

I claim:

1. In a process which comprises subjecting a substrate to white phosphorus to deposit the phosphorus at the surface of the substrate and thereafter subjecting the phosphorus-treated surface to a solution of a metal salt or complex thereof which is capable of reacting with the phosphorus to form a metal phosphide, wherein said metal is selected from groups IB, IIB, IVB, VB, VIB, VIIB and VIII of the Periodic Table, the improvement which comprises subjecting the said metal phosphide to an aqueous hypophosphite solution, which solution consists essentially of at least one alkali metal or alkaline earth metal hypophosphite.

2. A process wherein the substrate resulting from the process of claim 1 is electroplated to deposit an adherent metal coating on the treated substrate.

3. The process of claim 1 wherein said metal is selected from the group consisting of copper, silver, gold, chromium, cobalt, nickel and palladium.

4. The process of claim 3 wherein said substrate is a plastic.

5. The process of claim 4 wherein said metal is nickel.

6. The process of claim 5 wherein said hypophosphite is sodium hypophosphite.

7. The process of claim 6 wherein said aqueous hypophosphite solution contains about 2 to about 10 weight percent sodium hypophosphite.

8. The process wherein the treated plastic surface resulting from the process of claim 4 is electroplated to deposit an adherent metal coating on the treated plastic surface.

9. The process of claim 8 wherein said plastic is polypropylene, said phosphorus is employed as a solution of phosphorus dissolved in trichloroethylene, said metal is nickel, and said aqueous hypophosphite solution contains about 2 to about 10 weight percent sodium hypophosphite.

10. A process wherein the substrate resulting from the process of claim 1 is electroless plated to deposit an adherent electroless metal coating on the treated substrate.

11. The process of claim 10 wherein said substrate is a plastic, said metal is nickel and said hypophosphite is sodium hypophosphite.

12. The process of claim 11 wherein said aqueous hypophosphite solution contains about 2 to about 10 weight percent sodium hypophosphite.

13. The process wherein the treated plastic surface resulting from the process of claim 10 is electroplated to deposit an adherent metal coating on the treated plastic surface.

* * * * *